May 9, 1944.  T. J. SMULSKI  2,348,502
WINDSHIELD WIPER
Filed July 11, 1941  2 Sheets-Sheet 1
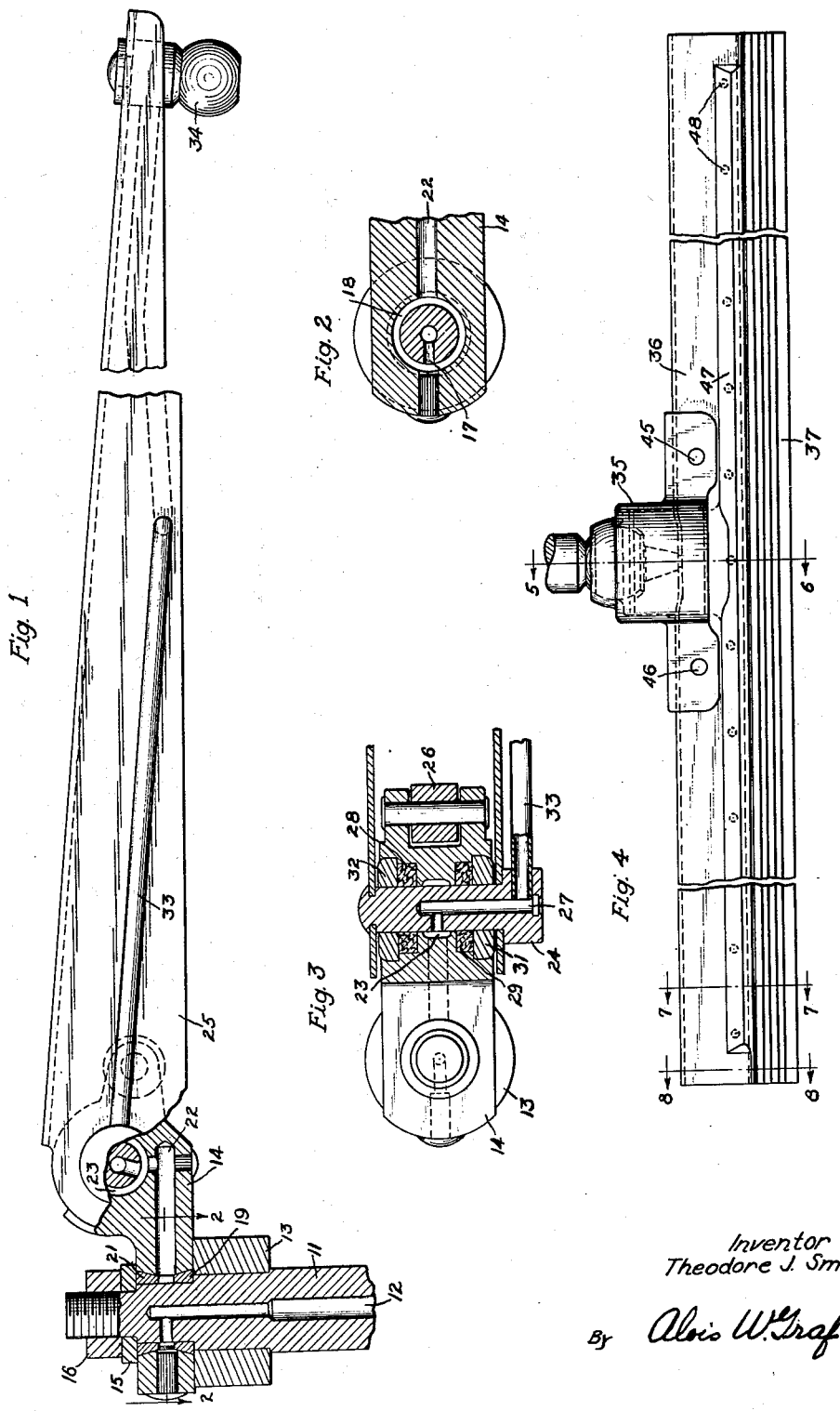
Inventor
Theodore J. Smulski
By Alois W. Graf
atty.

May 9, 1944. T. J. SMULSKI 2,348,502
WINDSHIELD WIPER
Filed July 11, 1941 2 Sheets-Sheet 2

Inventor
Theodore J. Smulski
By Alois W. Graf
atty.

Patented May 9, 1944

2,348,502

UNITED STATES PATENT OFFICE 2,348,502

WINDSHIELD WIPER

Theodore J. Smulski, Gary, Ind., assignor to Productive Inventions, Inc., a corporation of Indiana Application July 11, 1941, Serial No. 401,951

6 Claims. (Cl. 15—250.4)

My invention relates to windshield wipers, and more particularly to windshield wipers of the type operated to defrost or deice a windshield.

Heretofore numerous windshield wipers have been devised with means for applying a defrosting or deicing fluid to a windshield. Such devices have utilized numerous methods for applying the fluid such as a spray, or a fluid conducting passage for applying fluid alongside of a windshield wiper blade. Substantially all of these devices have been designed for use in connection with automobiles, but such devices are inadequate for use with high-speed vehicles, such as airplanes. The spray type is unsatisfactory since the high velocity of the airplane with respect to the wind scatters the fluid causing needless waste thereof. The type of defroster or deicer which merely generally conducts the deicing fluid alongside the windshield wiper blade also has a disadvantage when the fluid is not confined or so directed as to be spread properly across the surface to be wiped by the windshield wiper blade. The conservation of the deicing fluid is an essential factor in connection with windshield wipers for airplanes since on long-distance flights the weight of the supply of deicing fluid and the reservoir therefor is an important factor. The application of a deicing fluid to an airplane windshield must be controlled properly so as to minimize the effects of the air currents caused by the velocity of the airplane and the effects of the greater speed with which the wiper blade must move on an airplane windshield. If the application of the deicing fluid to the windshield is not controlled properly there is a resultant waste of fluid, and interference with vision, and in addition, it will be necessary to store a large quantity of deicing fluid in the airplane which would be contrary to the principle of minimizing weight wherever possible in the construction of an airplane. In accordance with my invention I provide a windshield wiper for use with airplanes which supplies a deicing fluid only ahead of the direction of the movement of the wiper blade close to the glass and at a proper angle so that the deicing fluid is positively spread over the surface to be wiped so that the movement of air across the windshield cannot displace and waste the deicing fluid.

It is therefore an object of my invention to provide an improved windshield wiper of the deicing type which will overcome many of the disadvantages inherent in the devices of the prior art and which will supply fluid to the windshield only ahead of the direction of movement and at proper distance and angle with respect to the windshield wiper blade.

Another object of my invention is to provide an improved windshield wiper of the deicer type wherein the wiper element of the wiper blade will control the flow of defroster fluid.

A further object of my invention is to provide an improved windshield wiper blade having a frame provided with portions complementary to and alternately engageable with the respective shoulders of the head of a wiper element.

Other and further objects of my invention will become apparent by reference to the following description taken in connection with the accompanying drawings in which:

Figure 1 represents a suitable type of windshield wiper arm attached to an actuating shaft of a windshield wiper motor;

Figure 2 is a cross sectional view of a portion of the connection between the windshield wiper arm and the windshield wiper motor actuating shaft;

Figure 3 is a cross sectional view of the pivotal connection between two portions of the arm shown in Figure 1;

Figure 4 shows a windshield wiper blade of the type suited for connection to the windshield wiper arm of Figure 1;

Figure 5:
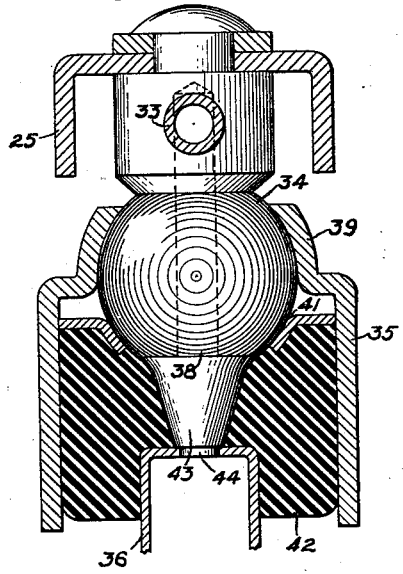
Figure 5 is a cross sectional fragmentary view through the blade of Figure 4 along the line 5—6 which extends through the connection between the wiper blade and the wiper arm.
Figure 8:
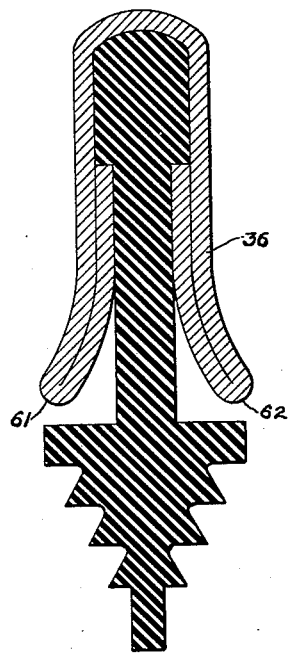
Figure 7 and Figure 8 are cross sectional views respectively along the lines 7—7 and 8—8 of Figure 4.

Referring more particularly to Figure 1, there is shown a windshield wiper shaft 11 which is provided with a fluid conducting passage 12. The shaft 11 may be provided with a collar 13 against which the inner member 14 of a windshield wiper arm may be secured by suitable means, such as a washer 15 and a nut 16. The fluid conducting passage 12 of the shaft 11 extends along the axis of the shaft 11 and joins with a passage 17 at right angles thereto which is shown in Figure 2. This passage 17 communicates with an annular passage 18 formed by conical wedge-like members 19 and 21 located between a reduced portion of the shaft 11 and the main portion of the inner section 14 of the windshield wiper arm. The inner section 14 of the windshield wiper arm is provided with a fluid conducting passage 22 which terminates in an annular recess 23 shown in Figure 3. The annular recess 23 surrounds the pivot member 24 of a windshield wiper arm having an outer section 25 joined thereby. The inner section 14 of the arm may be provided with a spring contact and bearing member 26 which is engageable by any suitable spring biasing means which may be supported within the channel-like portion of the outer arm section 25. Details of the spring biasing means do not per se form a part of the present invention. The spring biasing means may, however, desirably take the form illustrated in my pending application Serial No. 382,503 filed March 10, 1941, for Windshield wiper arms. The outer section 25 of the wiper arm is pivotally supported on the inner section 14 by means of the pivot member 24. In order to secure a fluid-tight connection between the fluid conducting passage 27 of the pivot connection there is provided a pair of gaskets 28 and 29 secured in position by suitable retaining members 31 and 32. The fluid conducting passage of the pivot member 24 is connected to a fluid conducting tube 33 which extends for a certain distance on the outside of the channel-like portion 25 of the outer arm section and then turns to the interior of the channel-like portion and runs along the interior until it reaches a blade connecting member 34 mounted at the outer extremity of the windshield wiper arm.

The blade connecting member 34 at the outer extremity of the windshield wiper arm cooperates with an intermediate blade connector 35 to which is fastened a windshield wiper blade having a metal frame 36 and a flexible wiper element 37 supported therein. The details of the connector members 34 and 35 with respect to the frame 36 of the windshield wiper blade may best be understood by reference to Figure 5. From this it will be seen that the connecting member 34 is supported from the outer end of the channel-like outer arm section 25 and that the member 34 is connected to the fluid conducting passage or tube 33. The connecting member 34 is provided with a fluid conducting passage 38 which extends through the ball-like portion of the member 34. The ball-like portion or terminal member 34 is mounted within a socket formed of two metal members 39 and 41 which comprise portions of the connector member 35. Directly beneath the metal member 41, which is part of the socket for the ball extremity of the terminal 34, there is provided a rubber gasket 42 which engages and surrounds a portion of the blade frame 36. The rubber gasket 42 is provided with a conical aperture 43 the lower portion of which communicates with an aperture 44 in the blade frame 36. The upper portion of the rubber gasket passage 43 is arranged to be considerably larger so that it will be at all times in communication with the fluid passage 38 through the ball portion of the terminal 34 even though the member 35 and the wiper blade channel 36 pivot from one side to the other during operation. The various parts heretofore described which comprise the connecting means between the fluid conducting passage of the windshield wiper arm and the fluid conducting passage of the windshield wiper blade 36 are retained in operative relation with respect to each other by inserting suitable fastening means in the openings or apertures 45 and 46 which extend through extensions or lugs of the connector member 35 and through suitable openings in the frame 36. Such means may comprise cotter keys so as to permit ready replacement of the windshield wiper blade comprising a wiper blade channel 36 and a wiper element 37.

Figure 6:
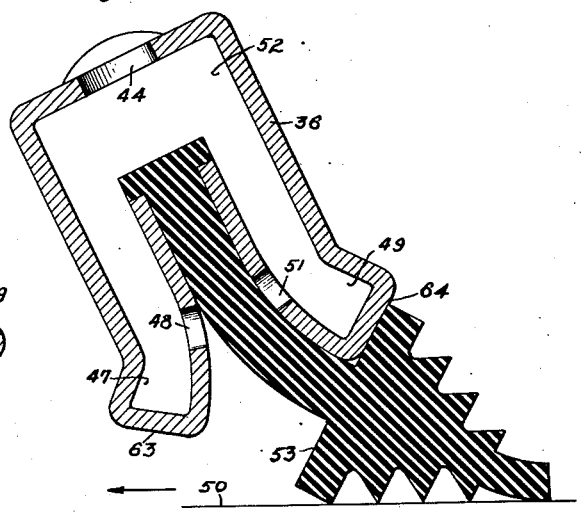
Figure 6 is a further view along the line 5—6 of Figure 4 showing only the cross sectional portion of the wiper blade channel and wiper element.

The wiper blade frame 36 is formed of a channel-like member, the outer edges of which are turned back into the channel. The configuration of the frame 36 may best be understood by reference to Figures 4, 6, 7 and 8. From Figure 4 it will be seen that one side of the frame 36 is provided with a fluid conducting passage 47 which is provided with a plurality of spaced apertures 48 adjacent the edge of the frame, and adjacent the wiper element 37. A similar fluid passage and spaced apertures 49 and 51 appear on the remote side of the wiper frame 36 as viewed in Figure 4. The two fluid conducting passages 39 and 47 join in a common passage 52 shown in Figure 6. The passage 52 is provided with an aperture 44 which communicates with the conical aperture 43 of the rubber gasket 42 shown in Figure 5. Figure 6 shows that the frame 36 supports a flexible wiper element 37 which in a position of operation in contact with a windshield wiper surface 50 cooperates alternately with the apertures or venting means 48 and 51 of the fluid conducting passages 47 and 49 to permit fluid to reach the windshield surface only ahead of the direction in which the windshield wiper blade is moving.

It of course will be understood that the spacing of the apertures 48 or the size thereof may be varied at different points along the wiper blade thereby to compensate for the effect of forces such as centrifugal force, and varying distance of travel of the liquid, which may affect the distribution of the defrosting fluid. A suitable variation of the spacing or of the sizes of the apertures may be provided so that an even distribution of fluid will be obtained over the surface to be wiped.

Figure 7:
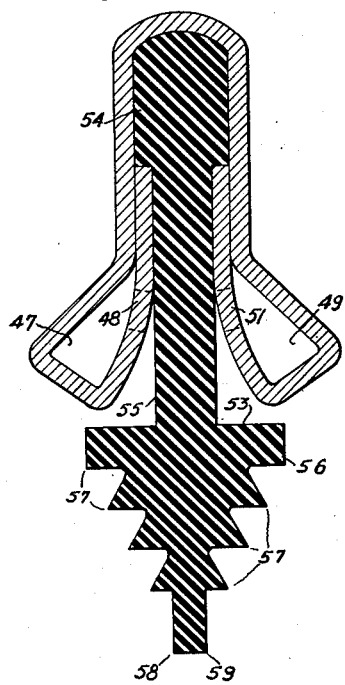

The flexible windshield wiper element 37, except for the portion adjacent the common fluid passage 52, is of a cross sectional shape shown in Figure 7. From this it will be seen that the flexible wiper element 37 has a body portion 54, a relatively thin web or neck portion 55 and a head portion 56 which is preferably substantially triangular in shape and which may be provided with a plurality of arrises 57. While a wiper element having this particular cross section is preferable, it is to be understood that other wiper elements may be used. It has been found that the head 56 may comprise another shape provided that a reinforced or enlarged cross sectional area is located immediately adjacent to the outer wiping edges 58 and 59 of the extremity of the flexible wiper element. Adjacent the outer longitudinal extremities of the frame 36 the inwardly turned portions of the frame 36 are in direct contact with the outer portions of the channel-like frame 36 so as to terminate the fluid conducting passages 47 and 49 in a manner illustrated in Figure 4 and Figure 8. By reference to Figures 6, 7 and 8 it furthermore will become apparent that the channel-like frame 36 while being in engagement with the upper or body portion 54 of the wiper element 37 and the upper portion of the neck 55 has its outer edges 61 and 62 spaced apart from the remainder of the neck portion 55 and the head portion 56 of the wiper element. It furthermore will be seen that over substantially the entire length of the wiper element 37 the lower sides 63 and 64 of the fluid conducting passages 47 and 49 serve as means for limiting the degree of flexure of the wiper element 37 by engagement of the shoulders or upper portions 53 of the wiper element head 56 with the under and outer sides of the respective fluid conducting passages.

In operation the windshield wiper blade assumes a position such as shown in Figure 6. The operation of the windshield wiper differs considerably from the operation of windshield wipers for automobiles, as for example the motor used to oscillate the wiper shaft 11 in one instance was rated as developing nearly three-fourths of a horsepower. The bias of the wiper arm against the windshield, which in automobiles is measured in pounds on airplane installations. Due to the spring pressure and the driving power it will readily be apparent that it is impractical to use a wiper element which is hollow or through which it is intended to supply a defrosting fluid. The ball and socket connection comprising the ball 34 and the intermediate connector 35 permit the frame 36 of the wiper blade to tilt from one side to the other at the beginning of each wiper stroke. Thus in Figure 6 the wiper blade is moving in the direction of the arrow and the web portion 55 of the wiper element 37 has closed the series of holes 51 since it is in engagement with the flared portion of the channel-like frame. One shoulder 53 of the wiper element head 56 is in engagement with the lower side 64 of the fluid conducting channel 49. This engagement between the shoulder 54 and the lower side of the fluid conducting channel limits the degree of flexure of the wiper element and, furthermore, serves to transmit the bias of the arm to the wiping edges of the wiper element, and prevents abnormal and disabling displacement of the wiping head 56 with relation to the frame 36 under the relatively heavy pressures of the blade on the glass necessary in aircraft service. Upon the return stroke the web 55 will engage the other flared channel portion thereby to close the series of apertures 48 and to open the apertures 51. The other shoulder 53 of the head 56 will engage the under surface 63 of the fluid conducting channel 47. Whereas in the drawings the shoulder 53 of the wiper element head has been shown as a plane surface and accordingly the under surface 63 of the fluid conducting channel 47 is also a plane surface complementary thereto, the shoulder 53 of the wiper element 37 may be of some other configuration whereupon the surface 63 of the frame 36 would have a configuration complementary thereto so as to engage a substantial portion of the shoulder 53 to act as a stop for the wiper element 37 and to transmit to the wiper element 37 pressure exerted by the wiper arm on the wiper blade.

While there has been shown a windshield wiper blade having a frame provided with fluid conducting passages 47 and 49 provided with apertures or venting means communicating with such passages or chambers, such apertures or venting means having been located adjacent the spaced edge portions of the frame and adjacent the neck portion 55 of the wiper element 37, these apertures may furthermore be located adjacent the spaced edge portions of the frame by having the apertures in the portion 63 and 64 of the frame. In the event that the apertures are placed in the undersurfaces 63 and 64 of the fluid conducting channels 47 and 49 the shoulders 53 of the head 56 of the wiper element 37 will operate to open the leading set or series of apertures and to close the trailing set or series of apertures at the beginning of each stroke of the wiper blade.

In operation a suitable windshield wiper motor oscillates the windshield wiper shaft 11. The shaft 11, as previously noted, is provided with a suitable fluid conducting passage 12 and this passage is connected to means for supplying under moderate pressure fluid of a defrosting or ice melting type. The oscillation of the shaft 11 causes a windshield wiper arm comprising an inner section 14 and an outer section 25 thereof to travel across against the windshield. The outer end of the windshield wiper arm is connected to a windshield wiper blade comprising a frame 36 and a flexible wiping element 37 which bears against the windshield. The flexible wiper element 37 cooperates with a series of apertures 48 and 51 so as to close the trailing series of apertures at the beginning of each stroke and to open the leading series of apertures to permit the defrosting fluid to reach the windshield just ahead of the wiper element close to the glass and at the proper angle. Thus a fluid from a suitable source passes through a fluid conducting passage 12 in the shaft to the passage 17, the annular passage 18, the passage 22 in the inner section 14 of the arm to annular passage 23 from whence the fluid passes in a passage 27 in the pivotal connection in the arm to the fluid conducting tube 33 along the arm to a fluid conducting passage 38 in the ball portion 34 at the extremity of the arm. From the fluid passage 38 in the ball portion 34 at the extremity of the arm the fluid passes through a conical aperture 43 in the rubber gasket 42 and on through an aperture 44 communicating with a common passage 52 which in turn communicates with the fluid passages 47 and 49 which extend longitudinally on each side of the frame 36 of the windshield wiper blade. By permitting the fluid to pass through only one set of apertures at a time just ahead of the direction of the movement of the windshield wiper blade and the flexible element thereof, the fluid is conserved and properly spread across the windshield by the head 56 of the windshield wiper element 37. At the same time that the defroster fluid is being spread the windshield wiper element also tends to remove any accumulations on the windshield. At the trailing side of the windshield wiper element 37 the surface is relatively smooth and the air pressure against the windshield does not have an opportunity to force the defroster fluid into uneven streaks to impair the vision. While the invention has been disclosed and explained with reference to airplane use, and has particular utility in that field of use, it is also useful in connection with surface vehicles.

Although the invention set forth is particularly suited for defrosting and cleaning a windshield, it will readily be appreciated that the structure shown may be used with other cleaning fluid such as water to remove from a windshield accumulations of dirt, and foreign matter which should be removed in order to obtain clear vision.

While a particular embodiment of my invention has been shown and described it will, of course, be understood that it is not to be limited thereto, since it is apparent that the principles herein disclosed are susceptible of embodiment in other structures, and hence, variations may be made in the instrumentalities employed without departing from the spirit and scope of the invention as set forth in the appended claims.

What I claim as new and desire to secure by Letters Patent of the United States is:

1. A windshield wiper defroster blade comprising a flexible wiper element and a supporting frame therefor, said frame comprising a channel-like member having edge portions spaced from said wiper element, a fluid conducting chamber located on each side of said member, a plurality of apertures communicating with said chambers and being located adjacent said spaced edge portions of said member, and means for connecting said chambers to a source of fluid.

2. A defroster windshield wiper blade comprising a channel-like frame having edge portions flared outwardly, a longitudinal fluid conducting chamber located at each side of said frame, said frame being provided with a plurality of apertures communicating with said chambers, said apertures being located adjacent said flared edge portions, and a flexible wiper element supported by said frame whereby said wiper element in operation will engage a different one of said flared portions and will thereby close the apertures communicating with one of said chambers during each stroke of said windshield wiper blade.

3. In a windshield wiper which includes a wiper blade, means for conducting cleaning fluid to the wiper blade, means for pressing the wiper blade yieldingly against a windshield, and means for operating the wiper blade through alternate strokes in opposite directions across the windshield in frictional engagement therewith, the feature of improvement in wiper blade construction which resides in the combination of a wiping element of deformable friction material, and a rigid holder therefor, said holder including a chamber for deicing fluid having outlet ports at opposite sides of the wiping element, and said wiping element being deformable laterally in response to the wiper operating force and the frictional drag of the windshield upon the wiping element to operate as a reciprocating valve for covering and sealing the ports at the trailing side of the wiping element and concurrently uncovering and opening the ports at the leading side of the wiping element at the beginning of each wiping stroke.

4. A windshield wiper blade, comprising a flexible wiper element having a body, a head provided with a plurality of wiping edges, a web portion connected between said head and said body, said head having shoulders adjacent said web, and a frame for said wiper element comprising a channel-like member having side portions flared outwardly and continuing in portions each corresponding substantially to the configuration of one of said shoulders, a longitudinal fluid conducting chamber extending along each side of said frame, said frame being provided with venting means on each side located adjacent said wiper element and communicating with said fluid chamber, said frame supporting said wiper element by engagement of said body and a portion of said web, said wiper element in operation being positioned so that the remainder of the web and the respective shoulders of the wiper element will engage different ones of said flared portions to close the venting means on opposite sides of said frame during alternate strokes of said wiper blade.

5. A windshield wiper blade for supplying a defrosting fluid to a windshield comprising a flexible wiper element and a supporting frame therefor, said frame comprising a channel-like member having reversely turned portions forming two longitudinal fluid conducting chambers, said reversely turned portions being spaced from said wiper element, and a plurality of apertures communicating with said chambers at intervals along said frame to supply defrosting fluid to a windshield.

6. A detachable windshield wiper blade for supplying defrosting fluid to a windshield comprising a flexible wiper element supported by a frame, said frame comprising a channel-like member having inwardly turned portions to form two longitudinal fluid conducting chambers, the surfaces of said chambers adjacent said wiper element being spaced therefrom, unitary means for connecting said blade to an arm and for connecting said chambers to a source of fluid, and a plurality of apertures communicating with said chambers and being positioned at intervals along said chambers to supply defrosting fluid to a windshield.

THEODORE J. SMULSKI.